(12) United States Patent
Kameoka

(10) Patent No.: US 11,027,597 B2
(45) Date of Patent: Jun. 8, 2021

(54) DECORATIVE MEMBER AND DECORATION METHOD

(71) Applicant: KOITO MANUFACTURING CO., LTD., Tokyo (JP)

(72) Inventor: Yasuhiro Kameoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 163 days.

(21) Appl. No.: 16/204,524

(22) Filed: Nov. 29, 2018

(65) Prior Publication Data
US 2019/0184794 A1    Jun. 20, 2019

(30) Foreign Application Priority Data

Dec. 15, 2017    (JP) .............................. JP2017-240437

(51) Int. Cl.
| | |
|---|---|
| *B60J 1/20* | (2006.01) |
| *F21S 41/37* | (2018.01) |
| *B60Q 1/04* | (2006.01) |
| *B60J 1/18* | (2006.01) |
| *B32B 15/08* | (2006.01) |
| *B32B 3/30* | (2006.01) |

(Continued)

(52) U.S. Cl.
CPC .................. *B60J 1/20* (2013.01); *B32B 3/30* (2013.01); *B32B 15/08* (2013.01); *B60J 1/18* (2013.01); *B60Q 1/04* (2013.01); *F21S 41/37* (2018.01); *F21S 41/50* (2018.01); *B32B 2307/412* (2013.01); *B32B 2307/416* (2013.01); *B32B 2605/006* (2013.01); *F21S 41/141* (2018.01); *F21S 41/143* (2018.01); *F21Y 2115/10* (2016.08)

(58) Field of Classification Search
CPC ...... B60J 1/20; B60J 1/18; F21S 41/37; F21S 41/50; B32B 3/30; B32B 15/08; B60Q 1/04
USPC .......................................................... 359/629
See application file for complete search history.

(56) References Cited

U.S. PATENT DOCUMENTS

| | | | | |
|---|---|---|---|---|
| 4,645,556 | A | * | 2/1987 | Waugh ..................... B41M 1/30 156/242 |
| 2012/0194884 | A1 | * | 8/2012 | Shinoda ................... G02B 5/32 359/2 |

(Continued)

FOREIGN PATENT DOCUMENTS

| | | |
|---|---|---|
| CN | 101180179 A | 5/2008 |
| CN | 101556754 A | 10/2009 |

(Continued)

OTHER PUBLICATIONS

Communication dated Jun. 24, 2020, from the China National Intellectual Property Administration in Application No. 201811424420.7.

*Primary Examiner* — James R Greece
(74) *Attorney, Agent, or Firm* — Sughrue Mion, PLLC

(57) ABSTRACT

A decorative member includes a light-transmitting substrate which is made of resin and is formed with a recessed portion on a back surface thereof, a hot stamping foil layer which is formed on the back surface of the light-transmitting substrate except for the recessed portion, and a metal vapor deposition film layer which is laminated on the recessed portion on the back surface of the light-transmitting substrate and the hot stamping foil layer.

7 Claims, 4 Drawing Sheets

(51) Int. Cl.
*F21S 41/50* (2018.01)
*F21S 41/141* (2018.01)
*F21Y 115/10* (2016.01)
*F21S 41/143* (2018.01)

(56) References Cited

U.S. PATENT DOCUMENTS

| | | |
|---|---|---|
| 2013/0248528 A1 | 9/2013 | Fushimi |
| 2014/0234594 A1* | 8/2014 | Ito .......................... G09F 23/00 428/203 |
| 2016/0083135 A1 | 3/2016 | Fushimi |
| 2019/0184794 A1 | 6/2019 | Kameoka |

FOREIGN PATENT DOCUMENTS

| | | |
|---|---|---|
| CN | 103237734 A | 8/2013 |
| CN | 203651229 U | 6/2014 |
| CN | 107139858 A | 9/2017 |
| CN | 209441100 U | 9/2019 |
| JP | 2004-198775 A | 7/2004 |
| JP | 2006-023272 A | 1/2006 |

* cited by examiner

FRONT SURFACE SIDE
(OUTSIDE OF VEHICLE) ← → BACK SURFACE SIDE
(INSIDE OF VEHICLE)

DECORATIVE MEMBER AND DECORATION METHOD

CROSS-REFERENCE TO RELATED APPLICATIONS

The present application claims priority from Japanese Patent Application No. 2017-240437, filed Dec. 15, 2017, the entire content of which is incorporated herein by reference.

TECHNICAL FIELD

Aspects of the present invention relate to a decorative member and a decoration method.

BACKGROUND ART

In recent years, there are needs for good-appearance decorations on a brand logo or the like, which has contrast between black and a metallic color. Conventionally, mask vapor deposition and hot stamping have been known for this kind of surface decoration. In the mask vapor deposition, a protruded portion is formed only on a portion to be decorated on a surface of a black substrate, and a mask is applied to perform metal vapor deposition only on the protruded portion. In the hot stamping, a protruded portion is formed only on a portion to be decorated on a surface of a black substrate, and metal foil is pressed on the protruded portion with a heated relief plate to be transferred. JP-A-2006-23272 discloses that a metal glossy half mirror layer is formed on a protruded portion of a substrate by hot stamping, and a black layer is applied to an edging portion by printing or the like. In this manner, decorations having a good appearance of a metallic color pattern can be applied to a black substrate.

However, in the above methods, the appearance may be poor as accuracy of a decoration boundary portion is poor or the decoration boundary is not clear due to occurrence of spreading out of a metal vapor deposition film, occurrence of insufficient transfer of the metal foil, or the like to the protruded portion of the portion to be decorated.

SUMMARY

Accordingly, an aspect of the present invention provides a decorative member having good appearance and a clear decoration boundary and a decoration method.

According to an embodiment of the present invention, there is provided a, a decorative member includes: a light-transmitting substrate which is made of resin and is formed with a recessed portion on a back surface thereof; a hot stamping foil layer which is formed on the back surface of the light-transmitting substrate except for the recessed portion; and a metal vapor deposition film layer which is laminated on the recessed portion on the back surface of the light-transmitting substrate and the hot stamping foil layer.

According to the above configuration, since the hot stamping foil layer is formed only on a flat portion except for the recessed portion on the back surface of the light-transmitting substrate and the metal vapor deposition film layer is laminated all over the back surface of the light-transmitting substrate (the recessed portion and the hot stamping foil layer), a boundary between the hot stamping foil layer and the metal vapor deposition film layer viewed from the front surface side is clear. Accordingly, a decorative member having a clear boundary and a good appearance can be provided.

In the above decorative member, a protruded portion may be formed on a front surface of the light-transmitting substrate to correspond to the recessed portion. According to this configuration, a sense of depth is generated in the metal vapor deposition film, so that the appearance can be improved.

In the above decorative member, the hot stamping foil layer may be black. According to this configuration, the appearance can be improved by contrast between a metallic color and black.

In the above decorative member, the metal vapor deposition film layer may be formed to have half mirror characteristics. According to this configuration, when a light source is provided on a back side, the decorative member can have a novel appearance which is different when the light source is turned on or not.

According to another embodiment of the present invention, there is provided a decoration method including: a recessed portion forming step of forming a recessed portion on a back surface of a light-transmitting substrate which is made of resin; a hot stamping step of applying hot stamping to the back surface of the light-transmitting substrate except for the recessed portion; and a metal vapor deposition step of applying metal vapor deposition to the recessed portion on the back surface of the light-transmitting substrate and a hot stamping foil layer formed by the hot stamping step. According to the decoration method, a decorative member can be provided in which a boundary of a decoration portion is clear, and accuracy of the boundary between a substrate and a pattern is high.

According to the above configuration, a decorative member having a clear decoration boundary and a good appearance can be provided.

BRIEF DESCRIPTION OF DRAWINGS

The above and other aspects of the present invention will become more apparent and more readily appreciated from the following description of illustrative embodiments of the present invention taken in conjunction with the attached drawings, in which.

DETAILED DESCRIPTION OF EMBODIMENTS

Hereinafter, a decorative member according to embodiments of the present invention will be described with reference to the drawings. The embodiments are illustrative rather than limiting the invention, and all features and combinations thereof described in the embodiments are not necessarily essential to the invention.

First Embodiment

Figure 1:
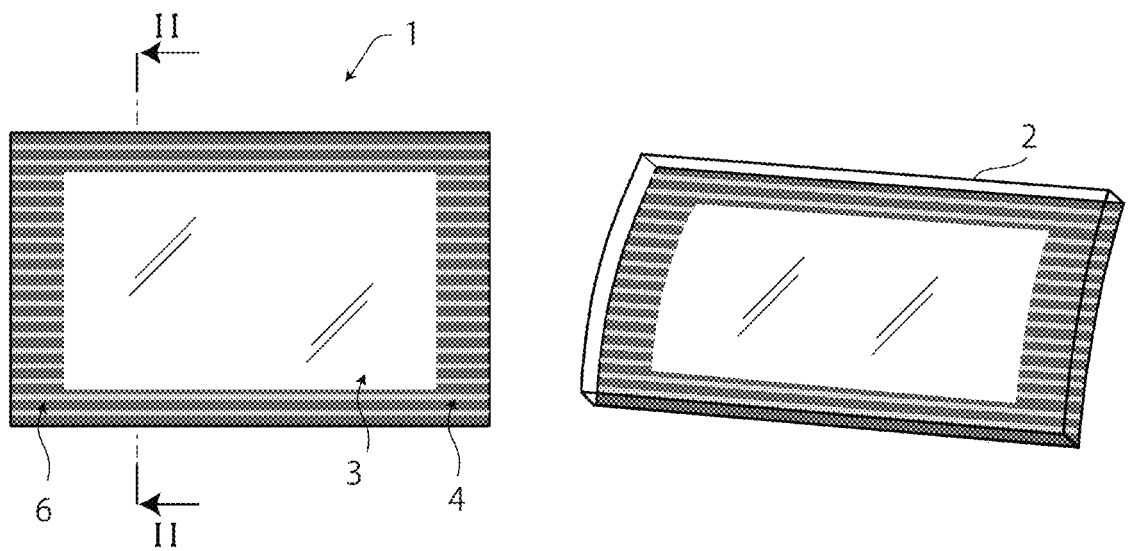
FIG. 1 is a perspective view schematically illustrating a rear window member as a decorative member according to a first embodiment.
Figure 2:
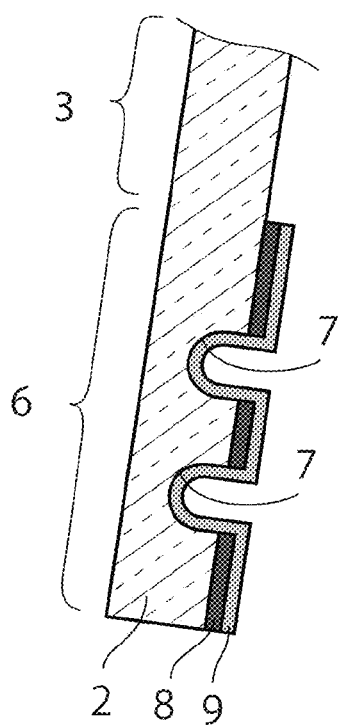
FIG. 2 is an enlarged sectional view taken along an II-II line in FIG. 1.

FIG. 1 illustrates an example where a decorative member according to an embodiment of the present invention is applied to a rear window member (window panel member) 1. FIG. 2 is an enlarged partial sectional view taken along an II-II line in FIG. 1. FIG. 2 illustrate a ratio of thicknesses of layers which does not reflect an actual ratio and schematically illustrate the configuration (same applied to FIGS. 3 and 4).

As illustrated in FIG. 1, the rear window member 1 is funned as a rectangular panel extending in a horizontal direction. On an edge of the rear window member 1, a decoration 4 of a stripe having a metallic color is applied to a black substrate over an entire periphery of an outer peripheral side region.

A decorative region 6 to which the decoration 4 is applied extends in a width direction at a predetermined width on both sides in a longitudinal direction and extends in the width direction at a constant width different from the predetermined width on both sides in the width direction. In order to clarify presence of the decorative region 6, the decorative region 6 is exaggeratedly drawn in FIG. 1.

As illustrated in FIG. 2, the rear window member 1 includes a transparent resin member 2 having light-transmitting characteristics as a main body. Therefore, in a non-decorative region 3 on the inside bounded by the decorative region 6, the inside and outside can be seen through as the rear window.

The transparent resin member 2 is made of, for example, a resin such as a polycarbonate resin or an acrylic resin such as a polymethyl methacrylate resin. In the present embodiment, although the rear window member is transparent, the rear window member may be colored as long as the rear window member has high transmittance and light-transmitting characteristics.

Recessed portions 7 are formed on a back surface side of the stripe portion of the decoration 4. The recessed portions 7 are formed over the entire length as grooves from a right end to a left end in an upper portion and a lower portion of the rear window member 1, and are formed at a predetermined distance from ends on left and right portions. The recessed portions 7 have constant width and are equally separated from each other.

A black hot stamping foil layer 8 is formed on the decorative region 6 other than the recessed portion 7 on the back surface of the transparent resin member 2. The hot stamping foil layer 8 is basically black, but is not limited to black, and may be other opaque colors.

The hot stamping foil layer 8 has a thickness of about several tens of μm in which a release layer, a colored layer, and an adhesive layer are sequentially laminated on a base film made of polyester, for example. If yellow or blue is selected as the colored layer besides black, a color tone of a metallic tone of gold or blue can be obtained by a combination with a metal vapor deposition film layer 9 described later.

The hot stamping foil layer 8 is laminated with a substantially uniform thickness on a flat portion of the back surface of the transparent resin member 2, and the entire of the hot stamping foil layer 8 is present on the same plane.

On the recessed portion 7 and the hot stamping foil layer 8 on the back surface of the transparent resin member 2 (back surface side of the rear window member 1), the metal vapor deposition film layer 9 is laminated with a substantially uniform thickness over the entire of the decorative region 6. That is, the metal vapor deposition film layer 9 is formed on the recessed portion 7 on the back surface of the decorative region 6 of the transparent resin member 2, and the two layers of the hot stamping foil layer 8 and the metal vapor deposition film layer 9 are formed on portions other than the recessed portion 7.

The metal vapor deposition film layer 9 is selected from, for example, aluminum, SUS, and chromium, and has a film thickness of about 100 nm, but is adjusted to a thickness of 80 nm or less in a case of a half mirror.

(Decoration Method)

Figure 3:
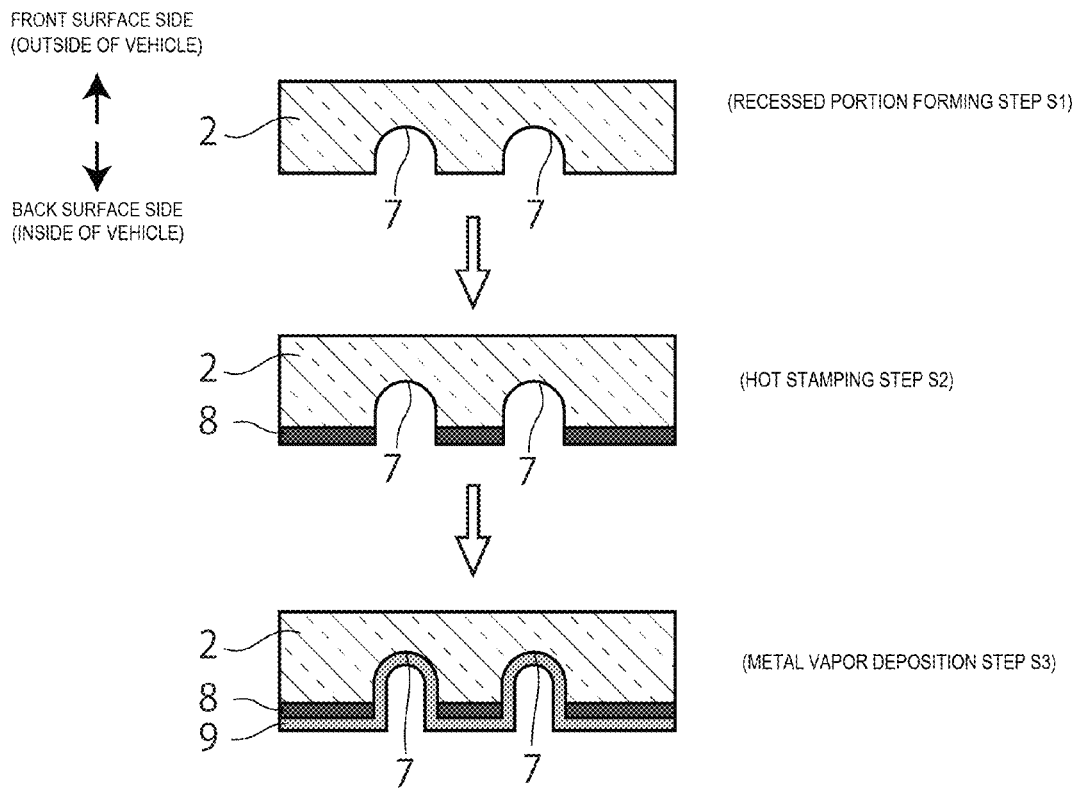
FIG. 3 is an explanatory diagram illustrating decoration steps.

A decoration method of the decoration 4 will be described referring to FIG. 3. First, the recessed portion 7 is formed on a back surface of a portion to which a pattern (stripe) of the decoration 4 of the transparent resin member 2 is applied (recessed portion forming step S1). For example, a technique such as laser decoration or metal molding of forming a recessed portion by irradiating, for example, a laser to foam or melt the transparent resin member 2 may be used. When the recessed portion 7 is formed with a metal mold, a protruded portion is formed in one mold to correspond to the recessed portion 7, and the transparent resin member 2 is injection molded in combination with the other metal mold. At this time, if a height of the protruded portion (the depth of the recessed portion 7) is set to 0.5 mm or more, the hot stamping foil is not transferred to the inside of the recessed portion 7 at the time of transfer of a later-described hot stamping foil. In the present embodiment, the pattern is a stripe, but may be a dot, a character, a curve, a geometric pattern, or the like.

Next, the hot stamping foil layer 8 is formed by pressing (hot stamping) a metal foil (hot stamping foil) on the decorative region 6 on the back surface of the transparent resin member 2 other than the recessed portion 7 with a heated relief plate (hot stamping step S2). In the hot stamping, since the metal foil is deposited only on a protruded portion, the protruded portion is formed in a portion to which the hot stamping is to be applied, and the metal foil is pressed. In the present embodiment, by forming the recessed portion 7 in the flat portion of the transparent resin member 2, the flat portion is formed as a relatively protruded portion, and the metal foil is pressed on the back surface of the transparent resin member 2 other than the recessed portion 7. Therefore, the metal foil can be transferred to all intended portions, so that insufficient transfer of the metal foil can be reduced and the accuracy of the boundary can be improved. Even in a minute pattern, high-accuracy decoration can be applied.

Next, a mask is applied to a non-decorative region 3 and metal vapor deposition is applied on the entire back surface of the transparent resin member 2 (metal vapor deposition step S3). For example, a metal such as aluminum is laminated by a technique such as vacuum vapor deposition to form the metal vapor deposition film layer 9. Materials such as SUS and Cr may be used for vapor deposition. Thus, the metal vapor deposition film layer 9 is formed on the entire of the recessed portion 7 and the hot stamping foil layer 8.

In general, in a case of decoration using the metal vapor deposition, a mask is applied to a portion other than a place to be decorated (a pattern portion) to perform metal vapor deposition. However, since the decoration is very fine and complicated, it is difficult to form a precise mask, and spreading out of the metal vapor deposition film occurs in general. In the present embodiment, it is not necessary to mask on the pattern portion only by applying the mask merely to the non-decorative region 3 having a large rectangular area. Since vapor deposition is applied to the entire surface of the decorative region 6, there is no concern about spreading out of the metal vapor deposition film.

(Operational Effect)

Figure 4:
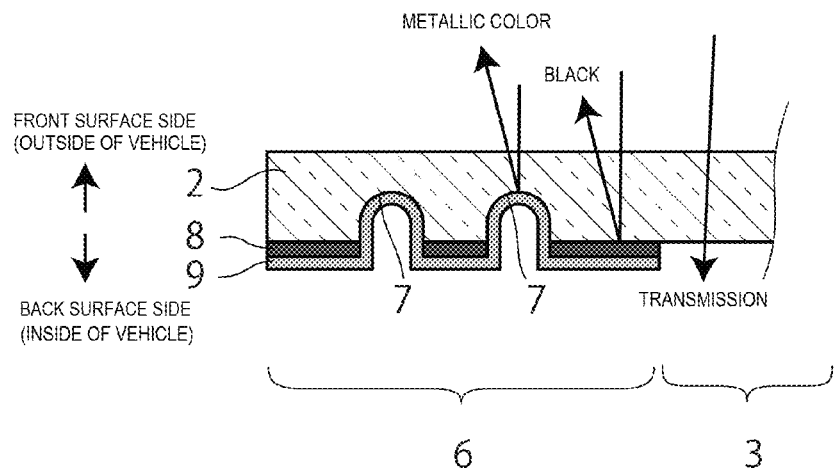
FIG. 4 is an enlarged sectional view illustrating operations and effects of the rear window member.

FIG. 4 is an explanatory diagram illustrating operations and effects of the rear window member 1. Arrows indicate paths of light. As illustrated in FIG. 4, when the decorative region 6 of the rear window member 1 is viewed from the front surface side, the recessed portion 7 appears to be a metallic color line and the hot stamping foil layer 8 appears to be black, so that the decorative region 6 is recognized by a user as the decoration 4 of the metallic color stripe on the black substrate. In the non-decorative region 3, light is transmitted, and the user can visually recognize the inside of the vehicle.

Since the decoration 4 has the recessed portion 7 on the back surface, it has sense of depth more than that is decorated merely on a surface, it has a stereoscopic effect, and contrast between black and metallic color makes the appearance good.

Since the hot stamping foil layer 8 is formed on the flat portion and the metal vapor deposition film layer 9 is laminated on the entire surface from the above, the boundary between the substrate (the hot stamping foil layer 8) and the pattern (the metal vapor deposition film layer 9) of the decoration 4 is clear, which provides a sharp impression where a partitioning is high and a high-grade sense.

In addition, by the decoration method, a decrease in accuracy of the boundary can be reduced between the substrate and the pattern due to spreading out or lack of vapor deposition, and a minute decoration having a clear boundary can be applied. By laminating the metal vapor deposition film layer 9 all over the decorative region 6, the boundary with the hot stamping foil layer 8 viewed from the front surface stands out, and the rear window member 1 can have a good appearance.

Second Embodiment

Figure 5:
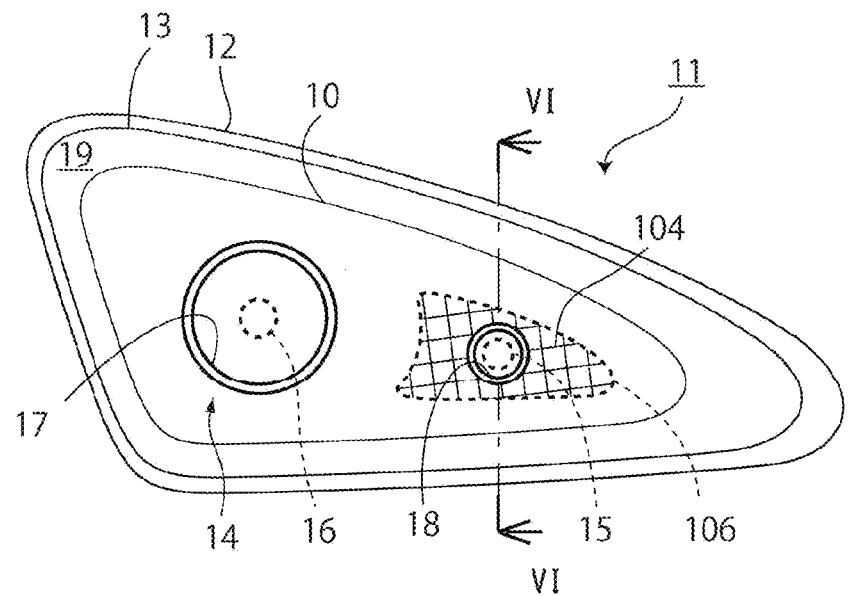
FIG. 5 is a front view of a vehicle lamp including an extension using a decorative member according to a second embodiment.
Figure 6:
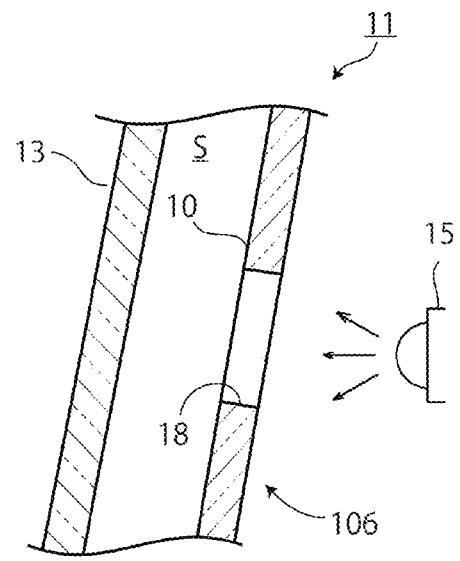
FIG. 6 is an enlarged sectional view taken along a VI-VI line in FIG. 5.
Figure 7:
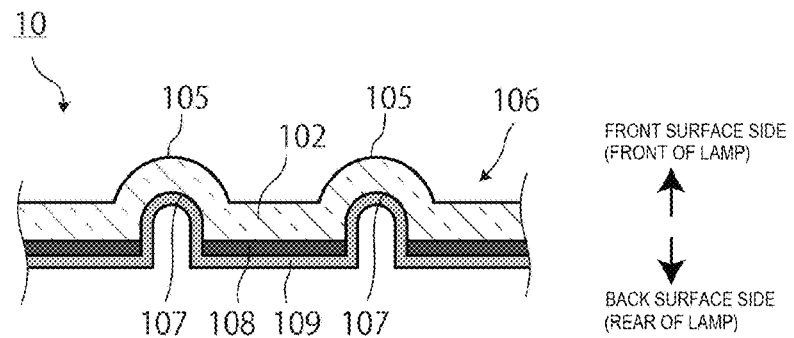
FIG. 7 is an enlarged sectional view of a decorative region of the extension.

FIG. 5 is a front view of a vehicle lamp 11 including an extension reflector 10 (hereinafter, simply referred to as "extension") as a constituent member using a decorative member according to a second embodiment, as viewed from the front of the vehicle. The vehicle lamp 11 illustrated in FIG. 5 is a right headlamp as viewed from the front of the vehicle. For ease of explanation, FIG. 5 does not illustrate a color of a decoration 104 of the extension 10 unlike FIG. 1, and a pattern ratio does not reflect an actual ratio. FIG. 6 is an enlarged partial sectional view taken along a VI-VI line in FIG. 5. FIG. 7 is an enlarged sectional view of a decorative region 106 of the extension 10. Terms relating to directions such as "front", "rear", "front surface", and "back surface" indicate directions with respect to the vehicle lamp 11 in a posture in which the vehicle lamp 11 is mounted on the vehicle unless otherwise specified.

The vehicle lamp 11 includes a lamp body 12, an outer cover 13, a lamp unit 14, a clearance lamp light source 15, and an extension 10.

The lamp body 12 has a container shape which is opened on the front surface. An outer cover 13 covers the opening of the lamp body 12 to define a lamp chamber 19 by the lamp body 12 and the outer cover 13.

The lamp unit 14 is for a headlamp and is configured to switch light emitted from a light source 16 such as an LED light source to a high beam and a low beam.

The clearance lamp light source 15 is, for example, an LED light source and is disposed on the side of the lamp unit 14.

The extension 10 is disposed between the lamp unit 14 and the outer cover 13. The extension 10 is configured such that a front surface shape of the transparent resin member 2 corresponds to a front surface shape of the vehicle lamp 11 by, for example, injection molding.

A lamp opening portion 17 is provided on a side of a vehicle center (left side in FIG. 5) with respect to a center of the extension 10, and a clearance lamp opening 18 is provided on a side of a vehicle side (right side in FIG. 5). The lamp unit 14 is disposed on a back surface side of the lamp opening portion 17, and the clearance lamp light source 15 is disposed on a back surface side of the clearance lamp opening portion 18. When the light source 16 of the lamp unit 14 and the clearance lamp light source 15 are turned on, irradiation light passes through the lamp opening portion 17 and the clearance lamp opening portion 18 respectively, and is emitted forward.

The decorative region 106 of the extension 10 is provided around the clearance lamp opening portion 18. The decoration 104 having a lattice pattern is applied to the decorative region 106. As illustrated in FIG. 7, similarly to the first embodiment, the extension 10 includes a transparent resin member 102 as a member main body, and a recessed portion 107 is formed on the back surface thereof to correspond to the lattice pattern of the decoration 104. It is different from the first embodiment that a bulging protruded portion 105 is formed on a front surface of the recessed portion 107 to correspond to the recessed portion 107. The recessed portion 107 and the protruded portion 105 are molded by injection molding or the like. By providing the protruded portion 105, a stereoscopic effect of the decoration 104 increases, and a high-grade sense increases.

A black hot stamping foil layer 108 is laminated on a flat portion of the back surface of the decorative region 106 of the extension 10 except for the recessed portion 107. The metal vapor deposition film layer 109 laminated on the recessed portion 107 and the hot stamping foil layer 108 is formed by half vapor deposition and has characteristics of a half mirror.

Figure 8A:
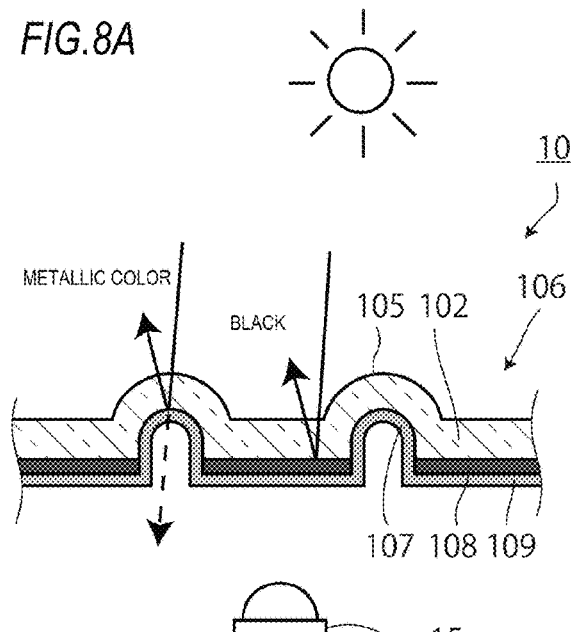
FIGS. 8A and 8B are enlarged sectional view illustrating operations and effects of the extension.
Figure 8B:
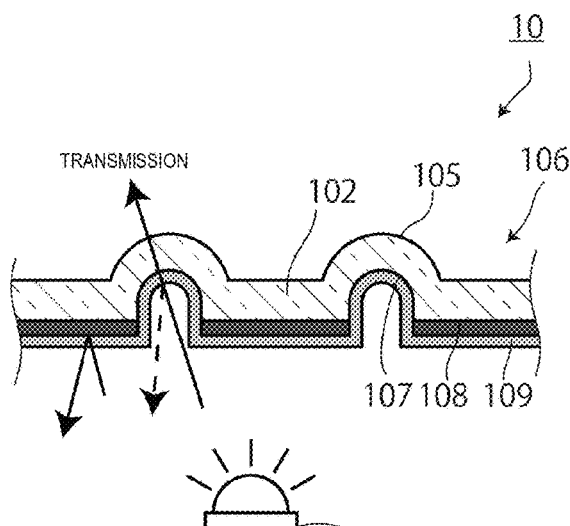

FIGS. 8A and 8B are sectional views of the extension 10 for explaining operations and effects of the metal vapor deposition film layer 109 having characteristics of the half mirror, and arrows indicate a light path. As illustrated in FIG. 8, when the clearance lamp light source 15 is turned off, the metal vapor deposition film layer 109 reflects light from the outside of the lamp, for example, sunlight in the daytime (part of the light is transmitted) and is recognized as a lattice pattern having a metallic color by a user. When the clearance lamp light source 15 is turned on, the metal vapor deposition film layer 109 transmits light from the clearance lamp light source 15 on the back side (part of the light is reflected). An appearance in which lattice-pattern light appears on the front surface of the extension 10 is recognized by the user.

Due to the half mirror characteristics of the metal vapor deposition film layer 109, the decoration 104 is different in appearance when the clearance lamp light source 15 is turned on or off. According to this configuration, the extension 10 can have a high partitioning and a novel appearance.

Although the rear window and the extension have been described in the above embodiments, the present invention is not limited thereto, and can be widely applied to various parts such as an inner lens and an outer cover.

Although embodiments of the present invention have been described above, the above embodiments are mere examples of the present invention, and these embodiments can be combined based on knowledge of those skilled in the art, and such forms are also included in the scope of the present invention.

The invention claimed is:

1. A decorative member comprising:
   a light-transmitting substrate which is made of resin and is formed with a recessed portion on a back surface thereof;
   a hot stamping foil layer which is formed on the back surface of the light-transmitting substrate except for the recessed portion; and
   a metal vapor deposition film layer which is laminated inside the recessed portion on the back surface of the light-transmitting substrate and on the hot stamping foil layer, wherein
   the light-transmitting substrate, the hot stamping foil layer, and the metal vapor deposition film layer are stacked in this order on a back surface side of the decorative member.

2. The decorative member according to claim 1, wherein a protruded portion is formed on a front surface of the light-transmitting substrate to correspond to the recessed portion.

3. The decorative member according to claim 1, wherein the hot stamping foil layer is black.

4. The decorative member according to claim 1, wherein the metal vapor deposition film layer is formed to have half mirror characteristics.

5. A decoration method comprising:
   a recessed portion forming step of forming a recessed portion on a back surface of a light-transmitting substrate which is made of resin;
   a hot stamping step of applying hot stamping to the back surface of the light-transmitting substrate except for the inside recessed portion; and
   a metal vapor deposition step of applying metal vapor deposition inside the recessed portion on the back surface of the light-transmitting substrate and on a hot stamping foil layer formed by the hot stamping step, wherein
   the light-transmitting substrate, the hot stamping foil layer, and the metal vapor deposition film layer are stacked in this order on a back surface side of the decorative member.

6. The decorative member according to claim 1, wherein the recessed portion is a concave groove recessed from the back surface of the light-transmitting substrate.

7. The decoration method of claim 5, wherein wherein the recessed portion is a concave groove recessed from the back surface of the light-transmitting substrate.

* * * * *